United States Patent
Lee et al.

(10) Patent No.: US 10,781,906 B2
(45) Date of Patent: Sep. 22, 2020

(54) MOTOR-DRIVEN POWER STEERING SYSTEM

(71) Applicant: Hyundai Mobis Co., Ltd., Seoul (KR)

(72) Inventors: Chi Ho Lee, Yongin-si (KR); Byeong Hoon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 109 days.

(21) Appl. No.: 15/796,433

(22) Filed: Oct. 27, 2017

(65) Prior Publication Data
US 2018/0119788 A1 May 3, 2018

(30) Foreign Application Priority Data
Oct. 31, 2016 (KR) .................. 10-2016-0144045

(51) Int. Cl.
*B62D 5/04* (2006.01)
*F16H 55/24* (2006.01)
*F16H 57/021* (2012.01)
*F16C 27/06* (2006.01)
*B62D 3/10* (2006.01)

(52) U.S. Cl.
CPC .............. *F16H 55/24* (2013.01); *B62D 3/10* (2013.01); *B62D 5/0409* (2013.01); *B62D 5/0421* (2013.01); *F16H 2057/0213* (2013.01)

(58) Field of Classification Search
CPC .. B62D 5/0409; B62D 5/0454; B62D 5/0442; F16H 27/066; F16H 55/24; F16H 2057/0222; F16C 27/066; F16C 27/06
USPC ...... 180/444; 74/388 PS, 427; 384/581, 582, 384/119, 125, 611, 535, 536
See application file for complete search history.

(56) References Cited

U.S. PATENT DOCUMENTS

| 5,801,468 A | * | 9/1998 | Choi | F16O 27/04 310/90 |
| 2010/0116582 A1 | * | 5/2010 | Rho | B62D 5/0409 180/444 |
| 2013/0209017 A1 | * | 8/2013 | Schadow | B24B 23/028 384/536 |
| 2014/0083794 A1 | * | 3/2014 | Ishii | B62D 5/0409 180/444 |
| 2015/0040699 A1 | * | 2/2015 | Hafermalz | F16H 57/039 74/89.16 |
| 2015/0107384 A1 | * | 4/2015 | Kwon | B62D 3/04 74/89.14 |
| 2016/0318544 A1 | * | 11/2016 | Kawamura | F16H 57/12 |
| 2017/0274925 A1 | * | 9/2017 | Kimijima | B62D 5/0403 |

FOREIGN PATENT DOCUMENTS

KR 10-2010-0009380 1/2010
KR 20170080899 * 7/2017 ........... B62D 5/0448

* cited by examiner

*Primary Examiner* — Anne Marie M Boehler
(74) *Attorney, Agent, or Firm* — H.C. Park & Associates, PLC

(57) ABSTRACT

A motor-driven power steering system includes a worm shaft unit having a worm gear, a worm wheel unit rotatably engaging with the worm gear, a housing unit having a worm receiving part formed therein to receive the worm shaft unit, and a shaft support unit having a support part located between the housing unit and the worm shaft unit to support the worm shaft unit, and a shaft pressing part located between the support part and the worm shaft unit to press the worm shaft unit towards the worm wheel unit.

8 Claims, 5 Drawing Sheets

MOTOR-DRIVEN POWER STEERING SYSTEM

CROSS-REFERENCES TO RELATED APPLICATION

This application claims priority from and the benefit of Korean Application No. 10-2016-0144045, filed on Oct. 31, 2016, which is hereby incorporated by reference for all purposes as if set forth herein.

BACKGROUND

Field

Exemplary embodiments relate to a motor-driven power steering system, and more particularly, to a motor-driven power steering system that is capable of reducing rattle noise while maintaining a steering feel.

Discussion of the Background

In general, a motor-driven power steering system is configured to drive a motor unit in an electronic control unit depending on running conditions of a vehicle detected by a vehicle speed sensor, a steering torque sensor and the like, thus assisting a driver's steering force.

Thus, the motor-driven power steering system provides a light and comfortable steering state in a low-speed operation, while providing a heavy and stable steering state in a high-speed operation. Further, the motor-driven power steering system copes with sudden emergency conditions to enable rapid steering, thus consequently giving an optimum steering feel to a driver.

The motor-driven power steering system includes a motor unit, a worm shaft unit rotatably connected with the motor unit, and a worm wheel unit rotatably engaging with the worm shaft unit. A rotating force of the worm shaft unit generated as the motor unit is driven is added to a driver's force for operating the steering wheel and then is transmitted to the steering shaft, thus stably maintaining a steering feel.

A conventional motor-driven power steering system is problematic in that, in the case of strongly pressing the worm shaft unit so as to reduce rattle noise, a frictional force is increased, so that a steering feel is poor, and the rattle noise is undesirably generated if a force for pressing the worm shaft unit is decreased.

Furthermore, the number of components of an apparatus for pressing the worm shaft unit is excessive, so that assemblability and durability are poor, and it is difficult to control a quality. Therefore, there is a need to solve these problems.

The related art of the present invention is disclosed in Korean Patent Laid-Open Publication No. 10-2010-0009380 published on Jan. 27, 2010 and entitled "Apparatus for maintaining gear engagement of motor-driven power steering system for vehicle".

The above information disclosed in this Background section is only for enhancement of understanding of the background of the invention and, therefore, it may contain information that does not constitute prior art.

SUMMARY

Embodiments of the present invention provide a motor-driven power steering system, which adjusts a force for pressing a worm shaft unit to improve a steering feel, simultaneously reduces rattle noise, enhances assemblability and durability, and makes it easy to control a quality.

In one embodiment, a motor-driven power steering system includes a worm shaft unit having a worm gear; a worm wheel unit rotatably engaging with the worm gear; a housing unit having a worm receiving part formed therein to receive the worm shaft unit; and a shaft support unit having a support part located between the housing unit and the worm shaft unit to support the worm shaft unit, and a shaft pressing part located between the support part and the worm shaft unit to press the worm shaft unit towards the worm wheel unit.

The shaft pressing part may be elastically deformed by contact with the worm shaft unit if the worm shaft unit is coupled to the support part, thus pressing the worm shaft unit towards the worm wheel unit.

The shaft pressing part may include a pair of shaft pressing parts, and pressing surfaces may be formed on the shaft pressing parts, respectively, to come into contact with the worm shaft unit, and the pair of pressing surfaces may be formed such that the farther away from a central axis of the worm shaft unit is, the shorter a distance between the pressing surfaces is.

The support part may include a support-part body provided between the housing unit and the worm shaft unit; and a stopper located between the support-part body and the worm shaft unit to limit a movement of the worm shaft unit.

The stopper may be located between the pair of shaft pressing parts to limit a distance to which the worm shaft unit enters between the shaft pressing parts.

The support part may further include an anti-rotation part protruding from an outer circumference of the support-part body and fitted into the housing unit, thus preventing the support-part body from rotating.

The support part may further include a cover coupled with the support-part body and fitted into an opening of the worm receiving part to close the opening.

The support part may further include a removal prevention part protruding from an outer circumference of the cover and fitted into the housing unit, thus preventing the support-part body from being removed from the housing unit.

The support part may further include a shaft seat located opposite to the shaft pressing part with respect to the worm shaft unit, the worm shaft unit being seated on the shaft seat; and a shaft guide connected with the shaft seat and extending towards the shaft pressing part to guide a movement of the worm shaft unit.

The support part and the shaft pressing part may be formed integrally with each other.

The shaft support unit may be made of an elastic material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
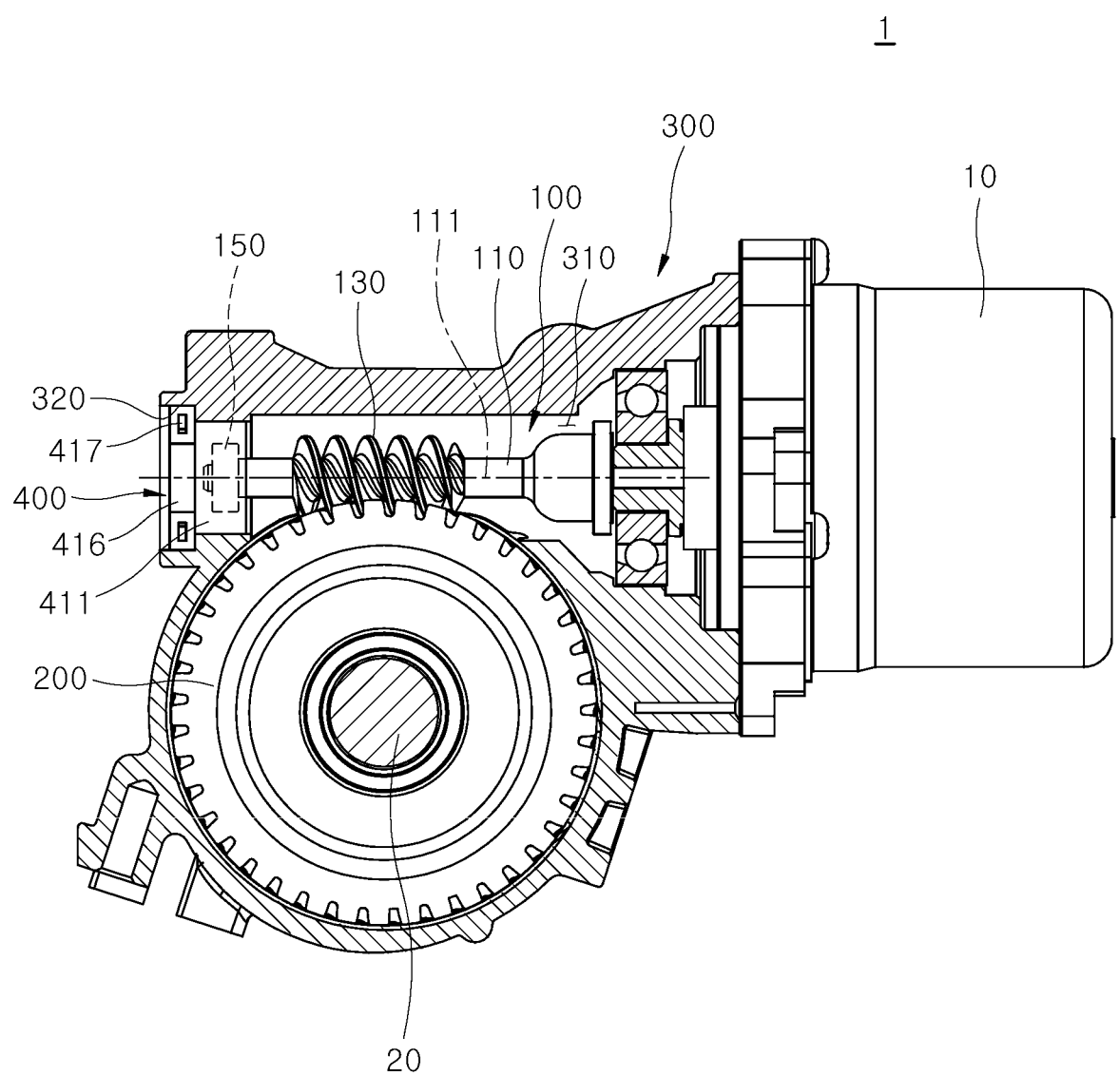
FIG. 1 is a cutaway view schematically illustrating a motor-driven power steering system according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
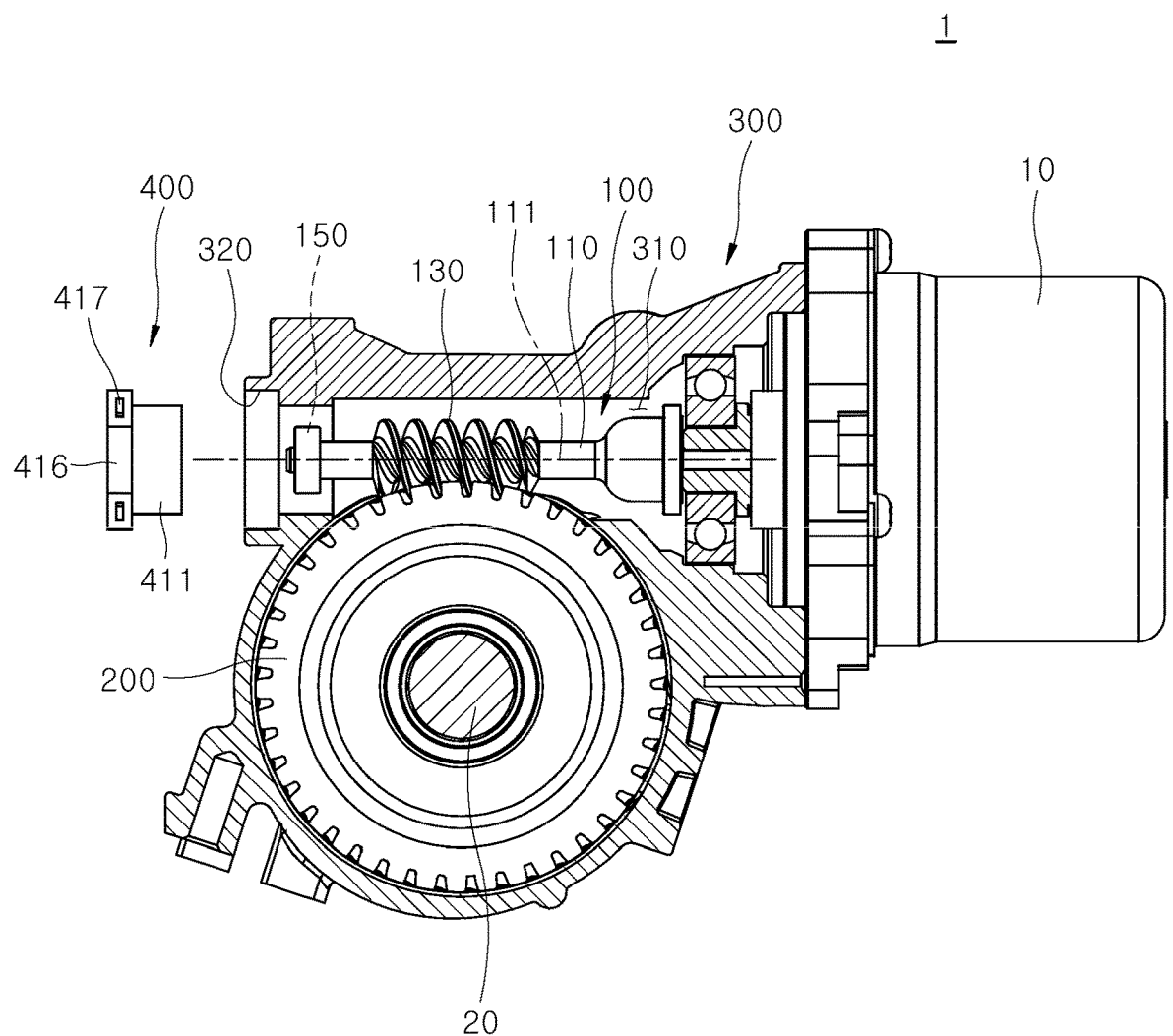
FIG. 2 is a view schematically illustrating the configuration of the motor-driven power steering system according to the embodiment of the present invention.

FIG. 1 is a cutaway view schematically illustrating a motor-driven power steering system according to an embodiment of the present invention, and FIG. 2 is a view schematically illustrating the configuration of the motor-driven power steering system according to the embodiment of the present invention.

Referring to FIGS. 1 and 2, the motor-driven power steering system 1 according to an embodiment of the present invention includes a worm shaft unit 100, a worm wheel unit 200, a housing unit 300, and a shaft support unit 400.

The worm shaft unit 100 is connected with a motor unit 10 to transmit a rotating force generated from the motor unit 10 to the worm wheel unit 200. According to this embodiment, the worm shaft unit 100 includes a worm shaft 110, a worm gear 130, and a shaft bearing 150.

The worm shaft 110 is connected at one end (right end when seen in FIG. 1) to the motor unit 10 and accommodated in the housing unit 300 to be rotated by the rotating force generated from the motor unit 10. The other end (left end when seen in FIG. 1) is rotatably supported by the shaft bearing 150.

The worm gear 130 is formed on an outer circumference of the worm shaft 110, and engages with an outer circumference of the worm wheel unit 200 to transmit a rotating force of the worm shaft 110 to the worm wheel unit 200.

The shaft bearing 150 is coupled at an inner circumference thereof to the other end (left end when seen in FIG. 1) of the worm shaft 110, and is coupled at an outer circumference thereof to the shaft support unit 400, thus rotatably supporting the worm shaft 110.

The worm wheel unit 200 rotatably engages with the worm gear 130. A steering shaft 20 is coupled to an inside of the worm wheel unit 200, thus transmitting power from the worm shaft unit 100 to the steering shaft 20.

The housing unit 300 is connected with the motor unit 10, and has a worm receiving part 310 therein so that the worm shaft unit 100 is received in the worm receiving part 310. According to this embodiment, the housing unit 300 is made of a metallic material to prevent a component such as the worm shaft unit 100 from being damaged by external shocks.

Figure 3:
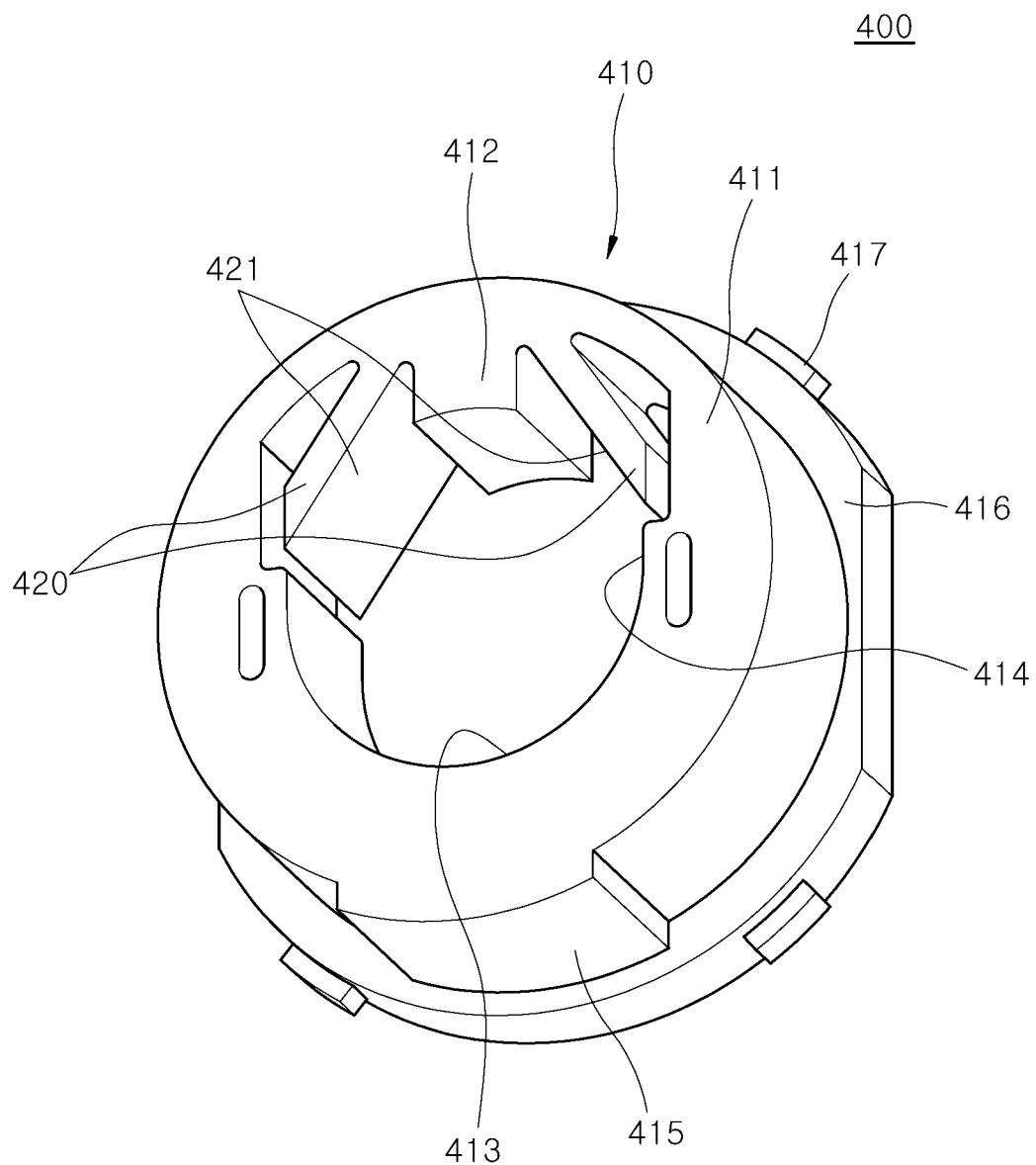
FIG. 3 is a perspective view illustrating one side of a worm-shaft support unit according to an embodiment of the present invention.
Figure 4:
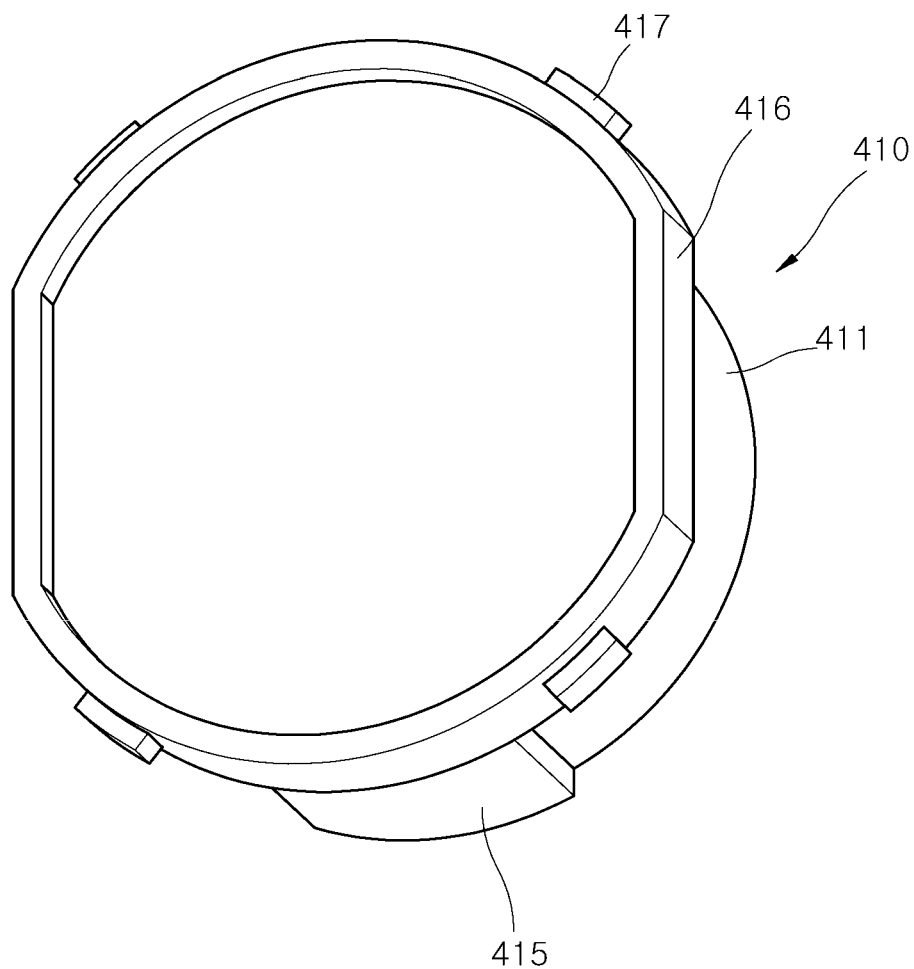
FIG. 4 is a perspective view illustrating the other side of the worm-shaft support unit according to the embodiment of the present invention.
Figure 5:
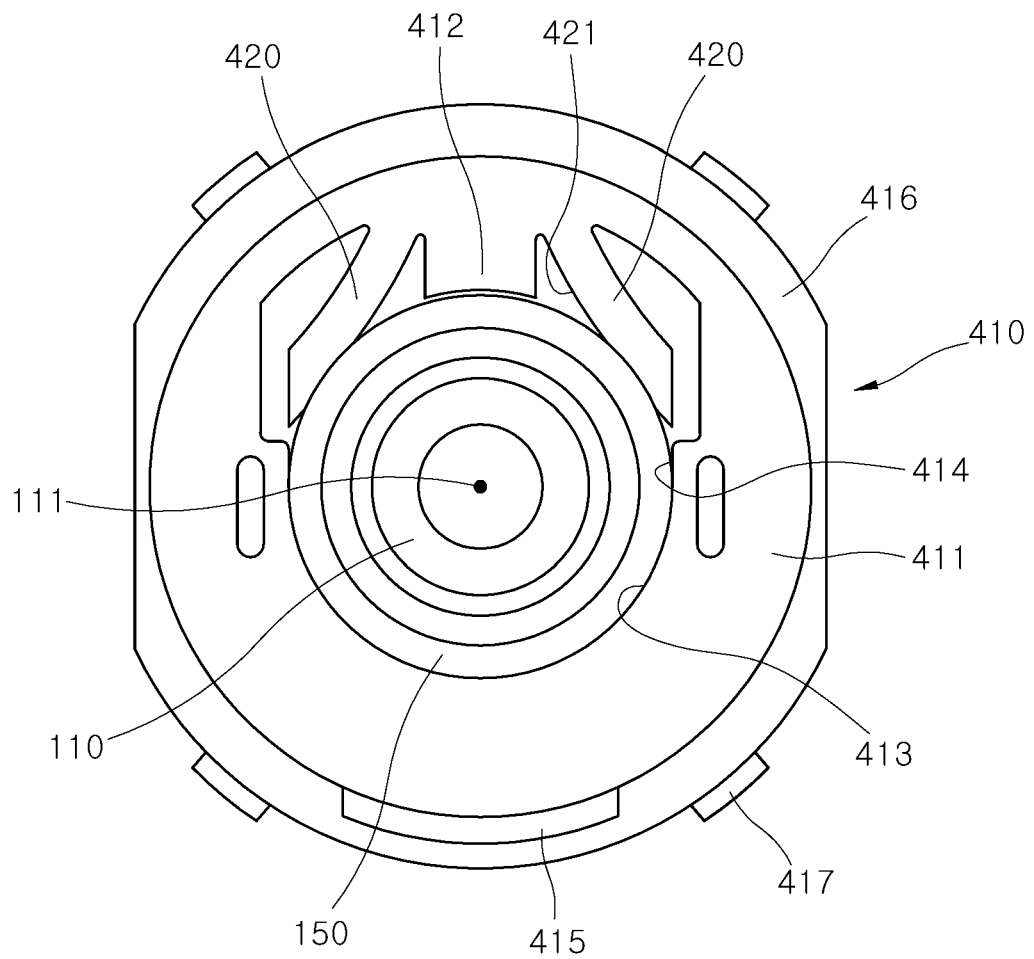
FIG. 5 is a view illustrating a state where a worm shaft unit is coupled to the worm-shaft support unit according to the embodiment of the present invention.

FIG. 3 is a perspective view illustrating one side of the worm-shaft support unit according to an embodiment of the present invention, FIG. 4 is a perspective view illustrating the other side of the worm-shaft support unit according to the embodiment of the present invention, and FIG. 5 is a view illustrating a state where the worm shaft unit is coupled to the worm-shaft support unit according to the embodiment of the present invention.

Referring to FIGS. 3 to 5, the shaft support unit 400 is coupled to the housing unit 300 to press the worm shaft unit 100 towards the worm wheel unit 200, is made of synthetic resin, and is formed as an integral structure through injection molding or the like. In this embodiment, the shaft support unit 400 includes a support part 410 and a shaft pressing part 420.

The support part 410 is located between the housing unit 300 and the worm shaft unit 100 to support the worm shaft unit 100 and thereby prevent the worm shaft unit 100 from being moved. In this embodiment, the support part 410 includes a support-part body 411 and a stopper 412.

The support-part body 411 is located between the housing unit 300 and the worm shaft 110 to limit the movement of the worm shaft 110.

The stopper 412 is disposed between the support-part body 411 and the worm shaft unit 100 to limit the moving extent of the worm shaft unit 100. In this embodiment, the stopper 412 is coupled to an inner circumference of the support-part body 411 to protrude towards the worm shaft unit 100, and is located between a pair of shaft pressing parts 420 to limit a distance to which the worm shaft unit 100 enters between the shaft pressing parts 420.

According to this embodiment, the support part 410 further includes a shaft seat 413 and a shaft guide 414, thus limiting the movement of the worm shaft unit 100 inserted into the support part 410.

The shaft seat 413 is located at a lower side (see FIG. 5) of the worm shaft 110 that is opposite to the shaft pressing part 420 located at an upper side (see FIG. 5) of the worm shaft 110. The shaft seat is concavely formed to correspond to the shape of the outer circumference of the worm shaft 110 or the shaft bearing 150, so that the worm shaft unit 100 is seated on the shaft seat.

The shaft guide 414 is connected with the shaft seat 413, and extends towards the shaft pressing part 420 to guide the movement of the worm shaft unit 100, thus preventing the worm shaft unit 100 from moving leftwards and rightwards (when seen in FIG. 5).

The shaft pressing part 420 is located between the support part 410 and the worm shaft unit 100 to press the worm shaft unit 100 towards the worm wheel unit 200. According to this embodiment, if the shaft pressing part 420 is coupled to the support part 410 and the worm shaft unit 100 is coupled to the shaft support unit 400, the worm shaft unit 100 is pressed towards the worm wheel unit 200 by a restoring force generated when elastic deformation occurs by the worm shaft unit 100.

According to this embodiment, a pair of shaft pressing parts 420 is provided, with a pressing surface 421 being formed on each pressing part to come into contact with the worm shaft unit 100. The pair of pressing surfaces 421 is formed in the shape of a wedge such that the farther away from the central axis 111 of the worm shaft unit 100 is, the shorter a distance between the pair of pressing surfaces 421 is. Thereby, the pressing surfaces stably press the worm shaft unit 100, thus allowing the worm shaft unit 100 to be pre-pressed towards the worm wheel unit 200.

In this embodiment, the support part 410 further includes an anti-rotation part 415. The anti-rotation part 415 protrudes from an outer circumference of the support-part body 411, and is fitted into the housing unit 300, thus preventing the support-part body 411 from being rotated relative to the housing unit 300.

According to this embodiment, the support part 410 further includes a cover 416. The cover 416 is coupled with the support-part body 411, and is fitted into an opening 320 of the worm receiving part 310, thus closing the opening 320 of the worm receiving part 310 and thereby preventing impurities from entering the worm receiving part 310.

In this embodiment, the support part 400 further includes a removal prevention part 417. The removal prevention part 417 protrudes from an outer circumference of the cover 416, and is fitted into the housing unit 300, thus preventing the support part 410 from being removed from the worm receiving part 310 of the housing unit 300.

According to this embodiment, the support part 410 and the shaft pressing part 420 are formed integrally with each other, thus reducing the number of components, making it easy to control the components, and reducing the number of assembly processes and an assembly time.

In this embodiment, since the support part 410 and the shaft pressing part 420 are formed integrally with each other, it is easier to control an assembly quality and a tolerance, as compared to the case of applying a plurality of components.

The shaft support unit 400 is made of an elastic material, and pre-presses the worm shaft unit 100, thus preventing a gap from occurring between the worm shaft unit 100 and the worm wheel unit 200.

Hereinafter, the operational principle and effects of the motor-driven power steering system 1 according to the embodiment of the present invention will be described.

In the state where the worm shaft unit 100 and the worm wheel unit 200 engage with each other, the shaft support unit 400 is inserted through the opening 320, so that the worm shaft unit 100, particularly the shaft bearing 150 is fitted into the shaft support unit 400.

Since the shaft pressing part 420 is elastically deformed by contact with the shaft bearing 150 while the worm shaft unit 100 is fitted into the shaft support unit 400, the worm shaft unit 100 is pre-pressed towards the worm wheel unit 200 by the restoring force of the shaft pressing part 420.

Since the worm shaft unit 100 is pre-pressed by the shaft support unit 400, the vibration of the worm wheel unit 200 is attenuated by a reverse input load during a travel, and shocks between the worm wheel unit 200 and the worm shaft unit 100 are reduced.

In this embodiment, since the shaft support unit 400 has the shaft guides 414 on both left and right sides (see FIG. 5) of the worm shaft unit 100 to come into contact with the worm shaft unit 100, it is possible to prevent the worm shaft unit 100 from being moved leftwards and rightwards (see FIG. 5).

Furthermore, according to this embodiment, since the shaft pressing parts 420 are formed in the shape of the wedge such that the farther away from the central axis 111 of the worm shaft unit 100 is, the shorter a distance between the pair of pressing surfaces 421 is. Thus, it is possible to stably press the worm shaft unit 100 down (see FIG. 5).

Moreover, the stopper 412 is provided between the pair of shaft pressing parts 420, thus stably preventing the worm shaft unit 100 from moving beyond a preset distance.

Furthermore, in this embodiment, since the anti-rotation part 415 protrudes from the outer circumference of the support part 410 to couple the shaft support unit 400 with the housing unit 300, it is possible to prevent the support part 410 from being rotated in the housing unit 300 by the rotation of the worm shaft unit 100.

Furthermore, in this embodiment, the shaft support unit 400 is provided with the cover 416 and the removal prevention part 417, thus preventing impurities from being introduced into the worm receiving part 310, and simultaneously preventing the shaft support unit 400 from being removed from the housing unit 300.

As described above, the present invention provides a motor-driven power steering system, in which components of a shaft support unit, particularly a support part and a shaft pressing part are formed integrally with each other, thus reducing the number of components, decreasing the number of assembly processes and shortening an assembly time, making it easy to control a quality, such as the tolerance of components, and reducing the cost of a product.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A motor-driven power steering system, comprising:
   a worm shaft unit having a worm gear;
   a worm wheel unit rotatably engaging with the worm gear;
   a housing unit having a worm receiving part formed therein to receive the worm shaft unit; and
   a shaft support unit including:
   a support part located between the housing unit and the worm shaft unit to support the worm shaft unit; and
   a shaft pressing part located between the support part and the worm shaft unit to press the worm shaft unit towards the worm wheel unit,
   wherein:
   the shaft pressing part is elastically deformed by contact with the worm shaft unit if the worm shaft unit is coupled to the support part, thus pressing the worm shaft unit towards the worm wheel unit;
   the shaft pressing part consists of a pair of shaft pressing parts, and pressing surfaces are formed on the shaft pressing parts, respectively, to come into contact with the worm shaft unit at only two locations, and the pair of pressing surfaces is formed in a wedge shape such that the farther away from a central axis of the worm shaft unit is, the shorter a distance between the pressing surfaces is;
   the support part comprises:
   a support-part body provided between the housing unit and the worm shaft unit; and
   only a single stopper located between the support-part body and the worm shaft unit to limit a movement of the worm shaft unit; and
   the pair of shaft pressing parts are disposed symmetrically to each other with respect to the single stopper.

2. The motor-driven power steering system of claim 1, wherein the single stopper is located between the pair of shaft pressing parts to limit a distance to which the worm shaft unit enters between the shaft pressing parts.

3. The motor-driven power steering system of claim 1, wherein the support part further comprises:
   an anti-rotation part protruding from an outer circumference of the support-part body and fitted into the housing unit, thus preventing the support-part body from rotating.

4. The motor-driven power steering system of claim 1, wherein the support part further comprises:
   a cover coupled with the support-part body and fitted into an opening of the worm receiving part to close the opening.

5. The motor-driven power steering system of claim 4, wherein the support part further comprises:
   a removal prevention part protruding from an outer circumference of the cover and fitted into the housing unit, thus preventing the support-part body from being removed from the housing unit.

6. The motor-driven power steering system of claim 1, wherein the support part further comprises:
   a shaft seat located opposite to the shaft pressing part with respect to the worm shaft unit, the worm shaft unit being seated on the shaft seat; and
   a shaft guide connected with the shaft seat and extending towards the shaft pressing part to guide a movement of the worm shaft unit.

7. The motor-driven power steering system of claim 1, wherein the support part and the shaft pressing part are formed integrally with each other.

8. The motor-driven power steering system of claim 7, wherein the shaft support unit is made of an elastic material.

\* \* \* \* \*